United States Patent
Namiki et al.

(10) Patent No.: US 12,415,700 B2
(45) Date of Patent: Sep. 16, 2025

(54) MEDIUM EJECTION DEVICE AND IMAGE READING DEVICE

(71) Applicant: SEIKO EPSON CORPORATION, Tokyo (JP)

(72) Inventors: Masaki Namiki, Kitakyushu (JP); Seiji Tezuka, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 18/438,241

(22) Filed: Feb. 9, 2024

(65) Prior Publication Data

US 2024/0270531 A1    Aug. 15, 2024

(30) Foreign Application Priority Data

Feb. 10, 2023    (JP) .................... 2023-018880

(51) Int. Cl.
*B65H 29/70* (2006.01)
*B65H 29/22* (2006.01)

(52) U.S. Cl.
CPC .......... *B65H 29/22* (2013.01); *B65H 29/70* (2013.01); *B65H 2403/51* (2013.01); *B65H 2511/13* (2013.01); *B65H 2553/51* (2013.01)

(58) Field of Classification Search
CPC ............ B65H 29/22; B65H 29/70; B65H 2301/5122; B65H 2301/51214; B65H 2403/51
USPC ......................................................... 271/188
See application file for complete search history.

(56) References Cited

U.S. PATENT DOCUMENTS

| | | | | |
|---|---|---|---|---|
| 6,499,737 B2* | 12/2002 | Slocum | .............. | B65H 29/70 271/188 |
| 7,434,802 B2* | 10/2008 | Yamamoto | ............ | B65H 29/70 271/188 |
| 7,992,863 B2* | 8/2011 | Jacobs | .............. | B65H 29/70 271/209 |
| 8,523,175 B2* | 9/2013 | Kobayashi | ............ | B65H 85/00 271/902 |
| 9,212,017 B2* | 12/2015 | Furusawa | ............ | B65H 29/52 |
| 2009/0206546 A1* | 8/2009 | Seki | .............. | B65H 29/70 271/207 |

FOREIGN PATENT DOCUMENTS

JP    2007-331845 A    12/2007

* cited by examiner

*Primary Examiner* — Michael McCullough
(74) *Attorney, Agent, or Firm* — WORKMAN NYDEGGER

(57) ABSTRACT

A medium ejection device includes a lever that is movably disposed at the position of a pair of ejection rollers including a first roller and a second roller that nip and eject a medium and moves from one of the rollers to another of the rollers to push the medium, a lever position adjustment unit that moves the lever in a movement direction to adjust an advance position, and a motor that transmits power to the pair of ejection rollers. When turning forward, the motor rotates the pair of ejection rollers in the direction in which the medium is ejected. When turning backward, the motor transmits power to the lever position adjustment unit and moves the lever.

17 Claims, 9 Drawing Sheets

MEDIUM EJECTION DEVICE AND IMAGE READING DEVICE

The present application is based on, and claims priority from JP Application Serial Number 2023-018880, filed Feb. 10, 2023, the disclosure of which is hereby incorporated by reference herein in its entirety.

BACKGROUND

1. Technical Field

The present disclosure relates to a medium ejection device and an image reading device.

2. Related Art

An example of this type of device is the one described in JP-A-2007-331845.

JP-A-2007-331845 discloses a paper ejection device that adds rigidity to paper to be ejected, that is, a paper ejection device that changes the portion for which rigidity is to be increased and the level of rigidity by using a dedicated driving source.

In the device described in JP-A-2007-331845, a dedicated driving source is used in a mechanism that adds rigidity to paper to be ejected. This device has room for improvement in the suppression of the size of the sheet ejection mechanism.

SUMMARY

To solve the problem described above, according to an aspect of the present disclosure, there is provided a medium ejection device including: a pair of ejection rollers including a first roller and a second roller that nip and eject a medium to be transported; a lever that is movably disposed at a position overlapping the pair of ejection rollers in an axial direction parallel to rotation shafts of the pair of ejection rollers, the lever moving in a movement direction from one of the first roller and the second roller to another of the first roller and the second roller to push the medium nipped between the pair of ejection rollers; a lever position adjustment unit that moves the lever in the movement direction to adjust an advance position; and a motor that transmits power to the pair of ejection rollers, in which the lever includes a first lever and a second lever, the first lever being located on one side of the pair of ejection rollers in the axial direction, the second lever being located on another side of the pair of ejection rollers in the axial direction away from the first lever, the first lever and the second lever are disposed to sandwich the pair of ejection rollers in the axial direction, and turning of the motor in a first rotation direction rotates the pair of ejection rollers in a direction in which the medium is ejected, and turning of the motor in a second rotation direction that differs from the first rotation direction transmits power to the lever position adjustment unit and moves the first lever and the second lever to the advance position.

According to an aspect of the present disclosure, there is provided an image reading device including: the medium ejection device according to the first aspect described below; and a reading unit that is located upstream of the medium ejection device in the transport direction and reads the medium to be transported, in which the medium passed through the reading unit is ejected by the pair of ejection rollers.

DESCRIPTION OF EMBODIMENTS

Figure 1:
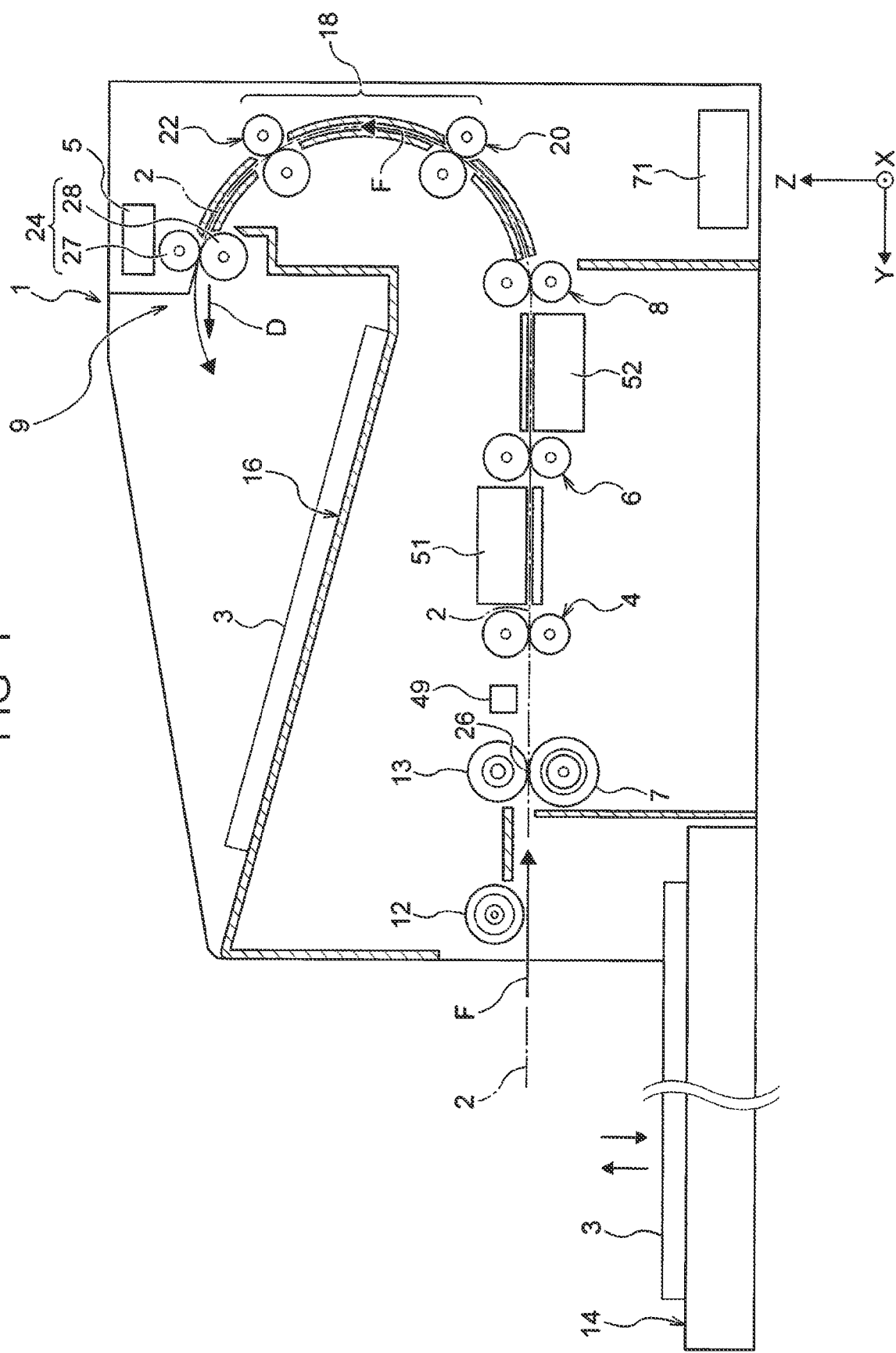
FIG. 1 is a side structural diagram schematically illustrating a main portion of an inside of an image reading device according a first embodiment.

The present disclosure will be first schematically described.

To solve the problem described above, according to a first aspect of the present disclosure, there is provided a medium ejection device including: a pair of ejection rollers including a first roller and a second roller that nip and eject a medium to be transported; a lever that is movably disposed at a position overlapping the pair of ejection rollers in an axial direction parallel to rotation shafts of the pair of ejection rollers, the lever moving in a movement direction from one of the first roller and the second roller to another of the first roller and the second roller to push the medium nipped between the pair of ejection rollers; a lever position adjustment unit that moves the lever in the movement direction to adjust an advance position; and a motor that transmits power to the pair of ejection rollers, in which the lever includes a first lever and a second lever, the first lever being located on one side of the pair of ejection rollers in the axial direction, the second lever being located on another side of the pair of ejection rollers in the axial direction away from the first lever, the first lever and the second lever are disposed to sandwich the pair of ejection rollers in the axial direction, and turning of the motor in a first rotation direction rotates the pair of ejection rollers in the direction in which the medium is ejected, and turning of the motor in a second rotation direction that differs from the first rotation direction transmits power to the lever position adjustment unit and moves the first lever and the second lever to the advance position.

The medium ejection device according to the aspect includes the lever that can advance from one of the first roller and the second roller that constitute the pair of ejection rollers to another of the first roller and the second roller and push the medium nipped between the pair of ejection rollers and the lever position adjustment unit that moves the lever in the movement direction to adjust an advance position. As a result, the medium ejected from the pair of ejection rollers is pushed by the lever being moved, and the rigidity of the medium increases due to deformation caused by the pushing. An increase in the rigidity of the medium reduces the risk of the medium being bent downward in an intermediate portion due to the weight of the front end in the ejection direction of the medium, that is, the risk of so-called buckling. Accordingly, the alignment of the media elected from the pair of ejection rollers on the ejection receiving unit can be improved.

In addition, turning of the motor in the first rotation direction rotates the pair of ejection rollers in the direction in which the medium is ejected, and turning of the motor in the second rotation direction that differs from the first rotation direction transmits power to the lever position adjustment unit and moves the first lever and the second lever. As described above, since the motor that transmits power to the pair of ejection rollers is also used as the power source of the lever position adjustment unit, a new motor need not be added, and the size can be suppressed from increasing.

A second aspect of the medium ejection device according to the present disclosure depends on the first aspect, in which the pair of ejection rollers include a pair of first ejection rollers and a pair of second ejection rollers spaced apart from the pair of first ejection rollers in the axial direction, the first ejection roller being one of the pair of first ejection rollers, the second ejection roller being one of the pair of second ejection rollers, and a third lever that differs from the first lever and the second lever is provided between the pair of first ejection rollers and the pair of second ejection rollers.

In the aspect, the third lever that differs from the first lever and the second lever is provided between the pair of first ejection rollers and the pair of second ejection rollers. This can further increase the rigidity of the medium and reduce the risk of the medium being bent downward in an intermediate portion due to the weight thereof.

A third aspect of the medium ejection device according to the present disclosure depends on the first aspect, the medium ejection device further including: a position detection unit that detects the advance position of the lever; and an encoder detects an advance amount of the lever, in which the advance position of the lever is determined based on a detection result of the position detection unit and a detection result of the encoder. It should be noted that the aspect can also depend on the second aspect.

In the aspect, since the advance position of the lever is determined based on the detection result of the position detection unit and the detection result of the encoder, the advance position of the lever can be determined accurately in accordance with the type of the medium.

A fourth aspect of the medium ejection device according to the present disclosure depends on the third aspect, in which the position detection unit is disposed at a position that overlaps part of the pair of ejection rollers in a direction in which the medium is ejected.

In the aspect, the position detection unit is disposed at a position that overlaps the part of the pair of ejection rollers in the direction in which the medium is ejected. This can suppress the size of the device in the height direction from increasing.

A fifth aspect of the medium ejection device according to the present disclosure depends on the first aspect and further includes a position detection unit that detects the position of the lever, in which the position detection unit includes a first position detection unit and a second position detection unit, the first position detection unit is configured to detect a first detected portion of the first lever, the second position detection unit is configured to detect a second detected portion of another lever other than the first lever, and the first lever, the other lever, the first position detection unit, and the second position detection unit are disposed such that the second position detection unit does not detect the other lever the when the first position detection unit detects the first lever, and the first position detection unit does not detect the first lever when the second position detection unit detects the other lever. It should be noted that the aspect can also depend on the second aspect.

In the aspect, the first lever, the second lever, the first position detection unit, and the second position detection unit are disposed such that the second position detection unit does not detect the second lever when the first position detection unit detects the first lever, and the first position detection unit does not detect the first lever when the second position detection unit detects the second lever. As a result, the advance position of the lever can be detected in a simple structure without the encoder being provided.

A sixth aspect of the medium ejection device according to the present disclosure depends on the first aspect, in which the lever position adjustment unit includes a cam and a one-way gear provided on a pivot shaft of the cam, since the cam does not pivot due to the one-way gear when the motor turns in the first rotation direction, the lever position adjustment unit does not operate, and since the cam pivots via the one-way gear when the motor turns in the second rotation direction, the lever position adjustment unit operates. It should be noted that the aspect can also depend on any one of the second to fifth aspects.

In the aspect, when the motor turns in the first rotation direction, since the pair of ejection rollers rotate in a direction in which the medium is ejected and the cam does not pivot due to the one-way gear, the lever position adjustment unit does not operate. On the other hand, when the motor turns in the second rotation direction, since the cam pivots via the one-way gear, the lever position adjustment unit operates. As a result, since the one-way gear is provided, the lever position adjustment unit need not be moved when the motor turns in the first rotation direction. Accordingly, since the lever position adjustment unit is not driven when the medium is ejected, stable ejection is ensured.

A seventh aspect of the medium ejection device according to the present disclosure depends on the sixth aspect and further includes a pushing member that pushes the lever, in which the lever includes a pushing portion that pushes the medium, a detected portion to be detected by the position detection unit, and a pivot shaft provided between the pushing portion and the detected portion, part of the lever between the pivot shaft and the detected portion is pushed by the pushing member, part of the lever between the pivot shaft and the detected portion is in contact with the lever position adjustment unit, and the pair of ejection rollers overlaps part of the cam and part of the pushing member in a direction in which the medium is ejected.

In the aspect, the lever includes the pushing portion that pushes the medium, the detected portion to be detected by the position detection unit, and the pivot shaft provided between the pushing portion and the detected portion, part of the lever between the pivot shaft and the detected portion is pushed by the pushing member, and part of the lever between the pivot shaft and the detected portion is in contact with the lever position adjustment unit. As a result, the operation of the lever can be achieved in a simple structure.

In addition, the pair of ejection rollers is disposed at a position that overlaps part of the cam and part of the pushing member in a direction in which the medium is ejected. This can suppress the size of the device in the height direction from increasing.

An eight aspect of the medium ejection device according to the present disclosure depends on the first aspect, in which the lever is moved by the lever position adjustment unit to a first advance position and a second advance position located beyond the first advance position. It should be noted that the aspect can also depend on any one of the second to seventh aspects.

In the aspect, the lever is moved by the lever position adjustment unit to a first advance position and a second advance position located beyond the first advance position. Accordingly, each of two media 3 with different thicknesses can be ejected so as to have appropriate rigidity.

A ninth aspect of the medium ejection device according to the present disclosure depends on the eight aspect, in which the lever is moved to a third advance position located beyond the second advance position.

In the aspect, since the lever may be moved to the third advance position located beyond the second advance position, each of three media with different thicknesses can be ejected so as to have appropriate rigidity.

A tenth aspect of the medium ejection device according to the present disclosure depends on the ninth aspect and further include a control unit; a separating unit that separates one medium from multi-fed media; and a medium thickness detection unit that is disposed downstream of the separating unit in a transport direction of the medium and detects information regarding a thickness of the media, in which the control unit causes the medium thickness detection unit to detect the medium separated by the separating unit and moves the lever to the second advance position when a detection result of the medium thickness detection unit is equal to or greater than a first threshold or moves the lever to the third advance position when the detection result of the medium thickness detection unit is smaller than the first threshold.

In most of the medium, a media with a small thickness, such as thin paper, has low rigidity, and a medium with a greater thickness than thin paper or the like, such standard paper, has higher rigidity than thin paper or the like. It is possible to distinguish between a medium with low rigidity and a medium with high rigidity in accordance with the information regarding the thickness of the medium detected by the medium thickness detection unit. The first threshold is set to distinguish between thin paper or the like and standard paper or the like in accordance with the detection result of the medium thickness detection unit. Accordingly, when the detection result of the medium thickness detection unit is smaller than the first threshold, the medium is determined to be thin paper or the like. When the detection result of the medium thickness detection unit is equal to or greater than the first threshold, the medium is determined to be standard paper or the like.

In the aspect, the control unit causes the medium thickness detection unit to detect the medium separated by the separating unit and moves the lever to the second advance position when a detection result of the medium thickness detection unit is equal to or greater than the first threshold or moves the lever to the third advance position when the detection result of the medium thickness detection unit is smaller than the first threshold. As a result, since, for example, the control unit moves the lever to the second advance position when the medium thickness detection unit detects standard paper or the control unit moves the lever to the third advance position when the medium thickness detection unit detects thin paper that is thinner and less rigid than standard paper, the advance position of the lever can be appropriately set in accordance with the thicknesses of two types of media.

An eleventh aspect of the medium ejection device according to the present disclosure depends on the tenth aspect, in which the control unit moves the lever to the first advance position when the detection result of the medium thickness detection unit is equal to or more than a second threshold that is greater than the first threshold.

The second threshold is set to distinguish between standard paper or the like and thick paper or the like in accordance with the detection result of the medium thickness detection unit. When the detection result of the medium thickness detection unit is smaller than the second threshold, the medium is determined to be standard paper or the like. When the detection result of the medium thickness detection unit is equal to or greater than the second threshold, the medium is determined to be thick paper or the like.

In the aspect, the control unit moves the lever to the first advance position when the detection result of the medium thickness detection unit is equal to or more than the second threshold that is greater than the first threshold. As a result, since the control unit 71 moves the lever 21 to a first advance position P1 when the medium thickness detection unit detects thick paper that is thicker and more rigid than standard paper, the advance position of the lever 21 can be appropriately set in accordance with the thicknesses of three types of media.

A twelfth aspect of the medium ejection device according to the present disclosure depends on the tenth aspect, in which the control unit is configured to receive the selected type of the medium and determines the advance position of the lever based on the selected type of the medium.

In the aspect, since the control unit can receive the selected type of the medium and determines the advance position of the lever based on the selected type of the medium, the control unit can select the advance position of the lever in accordance with the thickness of the medium selected by the user.

A thirteenth aspect of the medium ejection device according to the present disclosure depends on the tenth aspect, in which the control unit stops transport of the medium after the medium thickness detection unit detects the medium, determines the advance position of the lever based on the detection result of the medium thickness detection unit, moves the lever to the determined advance position of the lever, and resumes transport of the medium. It should be noted that the aspect can also depend on the eleventh aspect.

In the aspect, the control unit stops transport of the medium after the medium thickness detection unit detects the medium, determines the advance position of the lever based on the detection result of the medium thickness detection unit, moves the lever to the determined advance position of the lever, and resumes transport of the medium. That is, since the control unit stops transport of the medium after the detection by the medium thickness detection unit, the advance position of the lever can be set with great certainty.

A fourteenth aspect of the medium ejection device according to the present disclosure depends on the tenth aspect, in which the control unit determines the advance position of the lever based on the detection result of the medium thickness detection unit and, when the current advance position of the lever does not match the detection result, stops transport of the medium, matches the current advance position of the lever with the detection result, and resumes transport of the medium.

In the aspect, when the current advance position of the lever does not match the detection result, the control unit stops transport of the medium and matches the current advance position of the lever with the detection result. As a result, the advance position of the lever can be set with great certainty.

A fifteenth aspect of the medium ejection device according to the present disclosure depends on the second aspect, in which an odd number of levers are disposed, the lever being one of the odd number of levers, when a region between the pair of first ejection rollers and the pair of second ejection rollers is a first region and regions on both sides of the first region are a second region and a third region, the number of the levers disposed in the second region is identical to the number of the levers disposed in the third region. It should be noted that the aspect can also depend on any one of the third to fourteenth aspects.

In the aspect, an odd number of the levers are disposed, and the number of levers disposed in a second region on one side of the first region that is a center region is identical to the number of the levers disposed in a third region on the other side of the first region. As a result, with respect to the medium to be ejected, the number of the levers that push the medium on the left side and the number of the levers that push the medium on the right side in the width direction are identical to each other, the medium can be ejected in a well-balanced state between the left and right sides.

A sixteenth aspect of the medium ejection device according to the present disclosure depends on the second aspect, the medium ejection device further including: a pushing member that pushes the lever, in which the lever includes a pushing portion that pushes the medium, a pivot shaft is provided between the pushing portion and the pushing member, the lever position adjustment unit is in contact with the lever on an opposite side of the pushing member with the pivot shaft therebetween, and the pair of ejection rollers overlaps part of the lever position adjustment unit and part of the pushing member in a direction in which the medium is ejected. It should be noted that the aspect can depend on any one of the third to fifteen aspects.

In the aspect, the lever includes the pushing portion that pushes the medium, the pivot shaft is provided between the pushing portion and the pushing member, and the lever position adjustment unit is in contact with the lever on the side opposite of the pushing member with the pivot shaft therebetween. As a result, the operation of the lever can be achieved in a simple structure.

In addition, the pair of ejection rollers is disposed at a position that overlaps part of the lever position adjustment unit and part of the pushing member in the direction in which the medium is ejected. This can suppress the size of the device in the height direction from increasing.

According to a seventeen aspect of the present disclosure, there is provided an image reading device including: the medium ejection device according to the first aspect; and a reading unit that is located upstream of the medium ejection device in a transport direction of the medium and reads the medium to be transported, in which the medium that passed through the reading unit is ejected by the pair of ejection rollers.

In the aspect, the image reading device can obtain the same effects as the medium ejection devices according to the aspects.

EMBODIMENTS

Embodiments of the medium ejection device according to the present disclosure and an image reading device including the medium ejection device will be specifically described below with reference to the drawings.

In the following description, the three axes orthogonal to each other are referred to as an X-axis, a Y-axis, and a Z-axis, as illustrated in the drawings. The direction indicated by each of the arrows of the three axes (X, Y, Z) is a + direction, and the opposite direction thereof is a − direction. The Z-axis direction corresponds to the vertical direction, that is, the direction of gravity, with the +Z direction as a vertically upward direction and the −Z direction as a vertically downward direction. Each of the X-axis direction and the Y-axis direction corresponds to a horizontal direction. The +Y direction is a direction from the rear to the front of the device, and the −Y direction is a direction from the front to the rear of the device. The +X direction is a right direction of the device and the −X direction is a left direction of the device.

First Embodiment

Image Reading Device

An image reading device 1 according to the embodiment is a scanner that can read an image of a medium. Here, "image" refers to an object visually recorded on the medium, and examples thereof include characters, figures, tables, pictures, photographs, and the like. The medium is not limited to a sheet and may also be a card, a booklet, or the like.

As illustrated in FIG. 1, the image reading device 1 includes the reading units 51 and 52 that read an image of the medium 3, first transporting rollers 4 that are provided upstream of the reading unit 51 in the transport direction F and transports the medium 3 in the transport direction F along transport route 2, second transporting rollers 6 that are provided upstream of the other reading unit 52 located downstream of the reading unit 51, and third transporting rollers 8 that are provided downstream of the reading unit 52.

A feeding roller 13 and a separation roller 7 pair is disposed upstream of the first transporting rollers 4 in the transport direction F. The separation roller 7 functions as a separating unit that separates one medium from multi-fed media and transports the separated medium. Specifically, a torque limiter (not illustrated) applies rotational torque to the separation roller 7 to suppress a document from being multi-fed. It should be noted that a separation pad may be used instead of the separation roller 7.

A pick roller 12 is disposed upstream of the separation roller 7.

The feeding roller 13 and the separation roller 7 are located in the middle of the transport route 2 in the axial direction of the rotation shaft of the feeding roller 13.

In the embodiment, a curved reversal path 18 is provided downstream of the third transporting rollers 8. In the curved reversal path 18, fourth transporting rollers 20, fifth transporting rollers 22, and the pair of ejection rollers 24 are disposed in this order in the transport direction F. The rollers described above are driven by power from a drive source.

In FIG. 1, reference numeral 14 indicates the medium mount unit on which the media 3 to be read are set, and reference numeral 16 indicates an ejection receiving unit to which the medium 3 having been read is ejected.

The medium mount unit 14 moves up and down. When the medium 3 set on the medium mount unit 14 is fed in the transport direction F, the medium mount unit 14 first moves upward (+Z direction) and stops when the top of the set media 3 comes into contact with the pick roller 12. When the pick roller 14 rotates in this state, the medium 3 is fed in the transport direction F, and the front end of the medium 3 reaches a nip position 26 between the feeding roller 13 and the separation roller 7 pair.

In a multi-fed state in which the plurality of media 3 are fed, the separation roller 7 separates one medium 3 from the plurality of media 3, the first transporting rollers 4 transport the medium 3 in the transport direction F, and the reading unit 51 reads the image on the first side of the medium 3. In addition, the medium 3 that has been read by the reading unit 51 is transported by the second transporting rollers 6, and the reading unit 52 reads the image on the second side of the medium 3 opposite to the first side.

The medium 3 that has been read by the reading unit 52 is fed to the curved reversal path 18 by the third transporting rollers 8, transported by the fourth transporting rollers 20 and the fifth transporting rollers 22, and ejected to the ejection receiving unit 16 by the ejection rollers 24.

The control unit 71, which is, for example, a processor, controls and performs a series of operations: upward movement of the medium mount unit 14, initiation of transport of the medium 3 by using the pick roller 12, separation into individual media by using the feeding roller 13 and the separation roller 7, transport in the transport direction F, reading of an image by using the reading units 51 and 52, and transport in the transport direction F.

Medium Ejection Device

In the embodiment, the image reading device 1 includes a medium ejection device 9. The structure of the medium ejection device 9 will be described below with reference to FIGS. 1 to 9.

Figure 2:
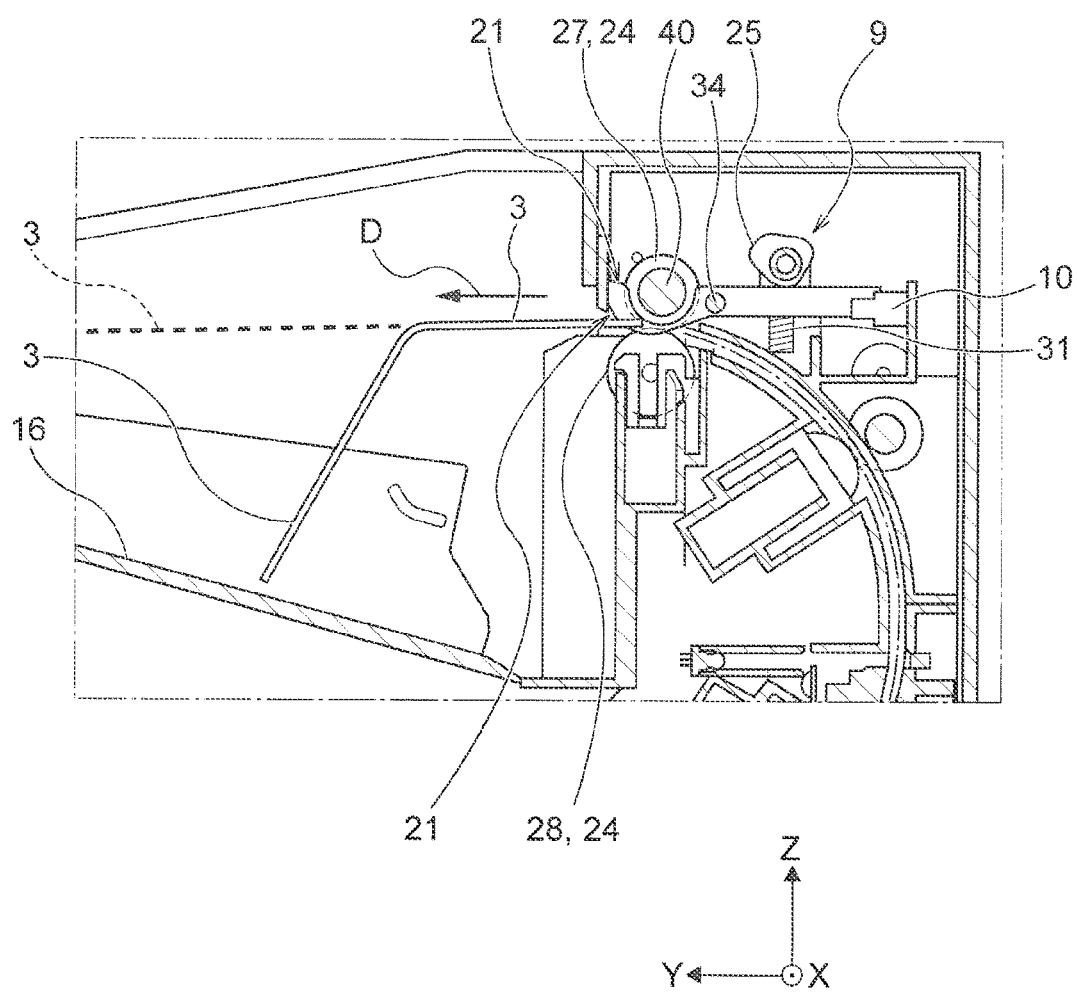
FIG. 2 is a side structural diagram of a main portion of a medium ejection device according to the first embodiment.
Figure 3:
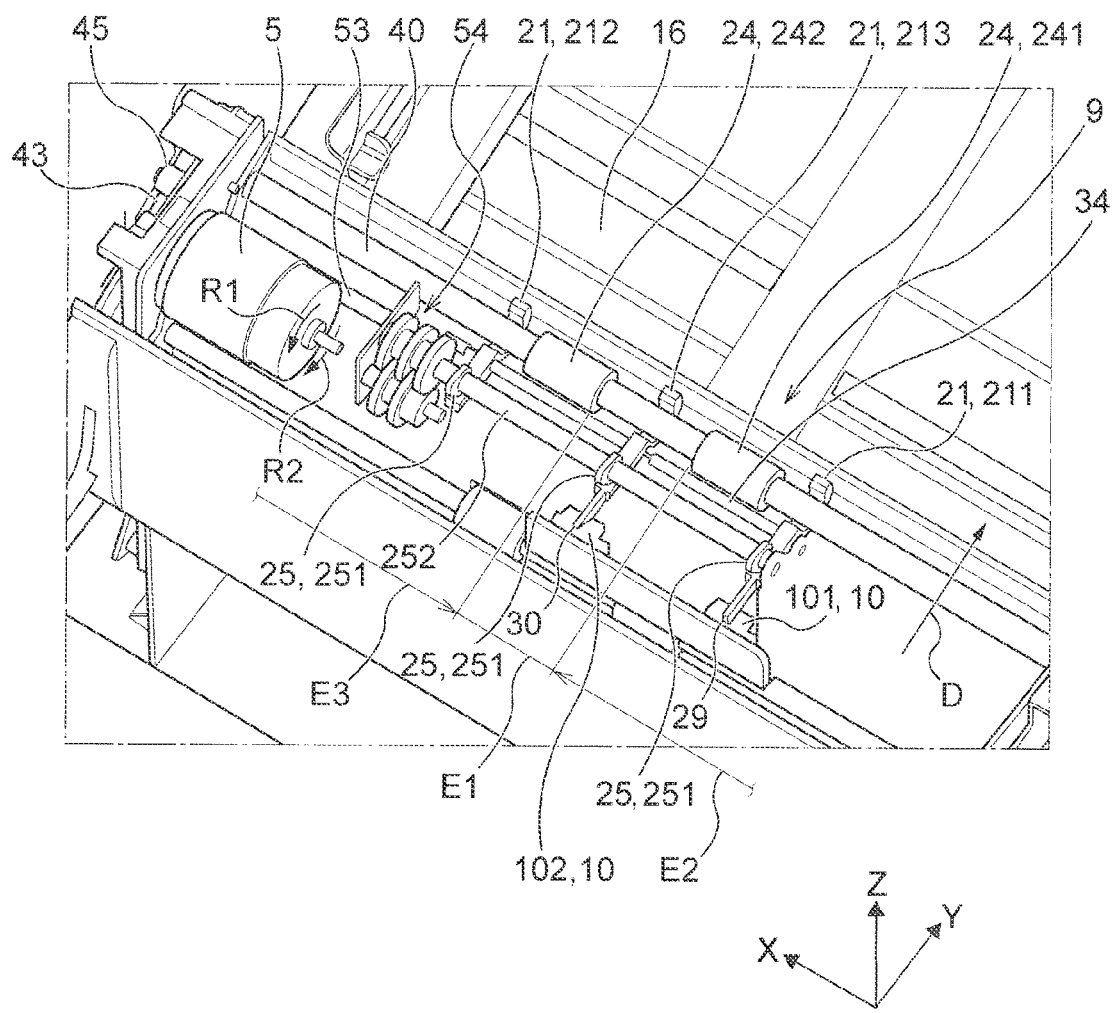
FIG. 3 is a perspective view of a main portion of the first embodiment.

As illustrated in FIGS. 2 and 3, the pair of ejection rollers 24 nips the transported medium 3 between the first roller 27 and the second roller 28 and ejects the medium 3. The medium ejection device 9 includes the pair of ejection rollers 24 including the first roller 27 and the second roller 28 and the lever 21 that is movably disposed at a position overlapping the pair of ejection rollers 24 in the axial direction, which is the X-axis direction, parallel to the rotation shafts 40 of the pair of ejection rollers 24 and moves in a movement direction from one of the first roller 27 and the second roller 28 to the other to push the medium 3 nipped between the pair of ejection rollers 24 in the movement direction. The medium ejection device 9 further includes the lever position adjustment unit 25 that moves the lever 21 in the movement direction (−Z direction) to adjust the advance position and the motor 5 (FIG. 3) that transmits power to the pair of ejection rollers 24.

Here, the lever 21 is disposed to move toward the second roller 28 from the first roller 27, that is, in the −Z direction as the movement direction. The lever 21 may be disposed to move toward the first roller 27 from the second roller 28. The medium nipped between the pair of ejection rollers 24 is deformed by being pushed by the lever 21 in the movement direction, and such deformation causes the medium to become rigid.

As illustrated in FIG. 3, the levers 21 include a first lever 211 located on one side in the width direction (X-axis direction) intersecting the transport direction F with respect to the pair of ejection rollers 24 and a second lever 212 located on the other side of the pair of ejection rollers 24 in the width direction away from the first lever 211. The first lever 211 and the second lever 212 are disposed to sandwich the pair of ejection rollers 24. It should be noted that the width direction may also be referred to as the axial direction of the rotation shaft 40 of the pair of ejection rollers 24.

The turning of the motor 5 in a first rotation direction R1 illustrated in FIG. 3 rotates the pair of ejection rollers 24 in the direction in which the medium 3 is ejected, and the turning of the motor 5 in a second rotation direction R2 that differs from the first rotation direction R1 transmits power to the lever position adjustment unit 25 and moves the first lever 211 and the second lever 212 to the advance position. The structure for transmitting power from the motor 5 to the lever position adjustment unit 25 will be described later.

As illustrated in FIG. 3, in the embodiment, the pair of ejection rollers 24 includes a pair of first ejection rollers 241 and a pair of second ejection rollers 242 spaced apart in the width direction from the pair of first ejection rollers 241. In addition, a third lever 213 that differs from the first lever 211 and the second lever 212 is provided between the pair of first ejection rollers 241 and the pair of second ejection rollers 242.

Figure 7A:
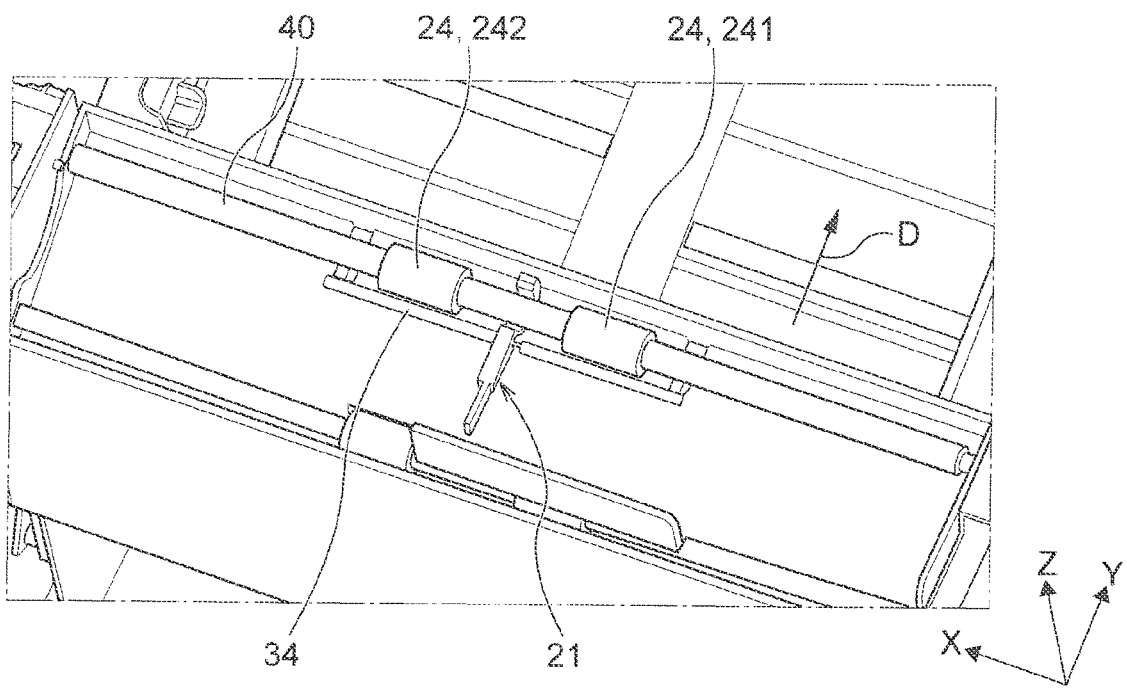
FIG. 7A is a perspective view of a main portion of the first embodiment.
Figure 7B:
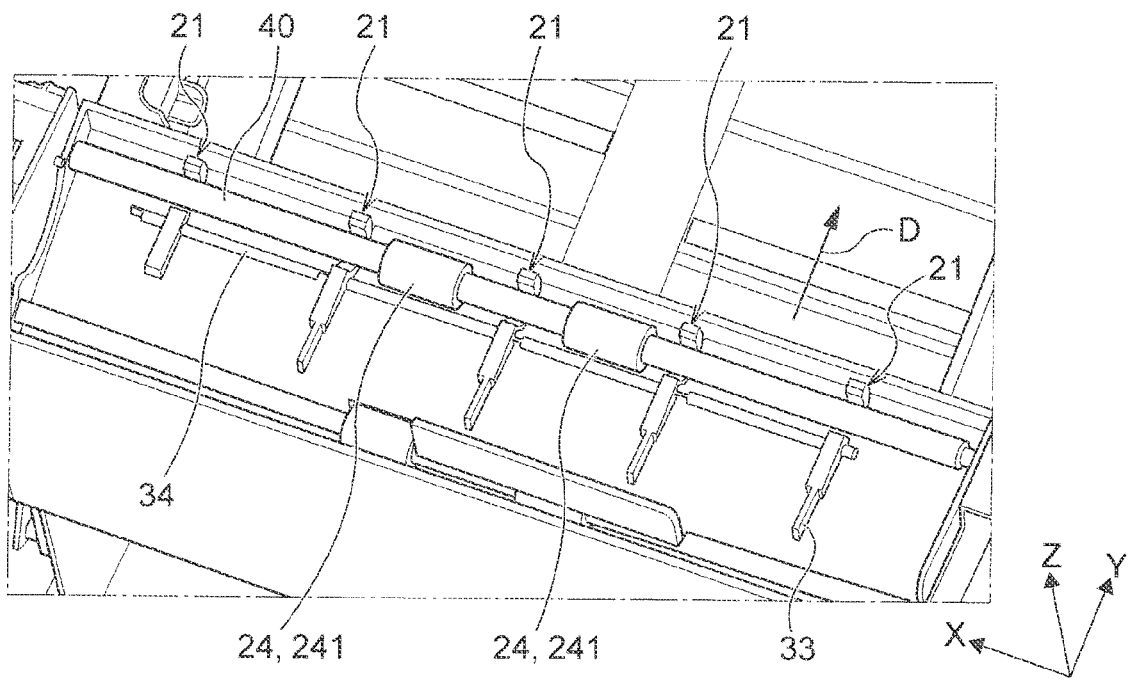
FIG. 7B is a perspective view of the main portion of the first embodiment.

As illustrated in FIGS. 3 and 7, an odd number of levers 21 may be provided in the embodiment. FIG. 7A illustrates the case in which one lever 21 is provided, and FIG. 7B illustrates the case in which five levers 21 are provided. In addition, when the region between the pair of first ejection rollers 241 and the pair of second ejection rollers 242 is a first region E1 and the regions on both sides of the first region E1 are a second region E2 and a third region E3, the number of the levers 21 disposed in the second region E2 may be identical to the number of the levers 21 disposed in the third region E3.

Figure 6A:
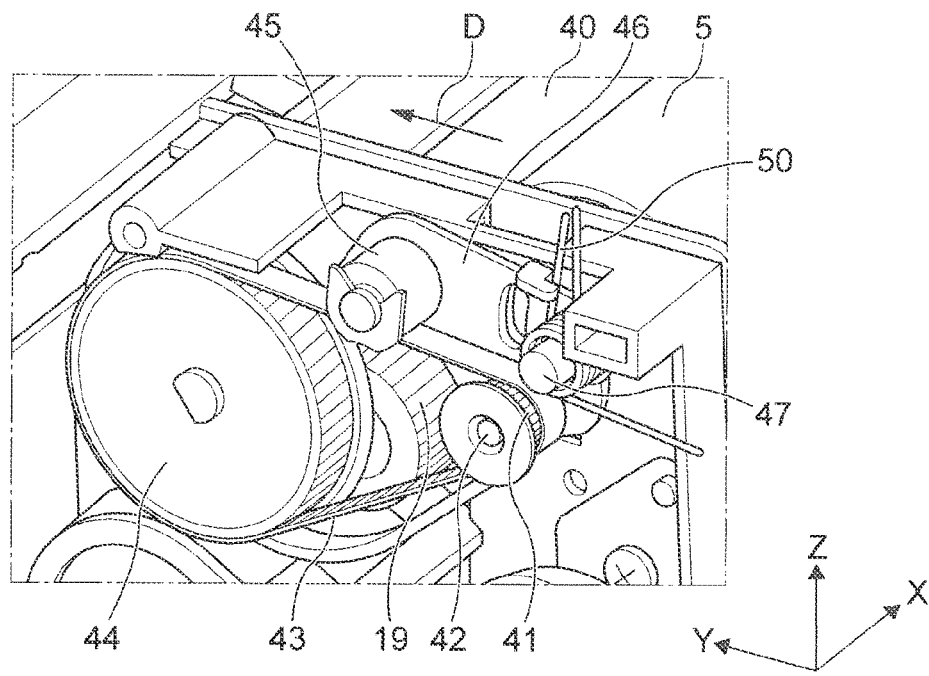
FIG. 6A is a perspective view of a main portion of the first embodiment.
Figure 6B:
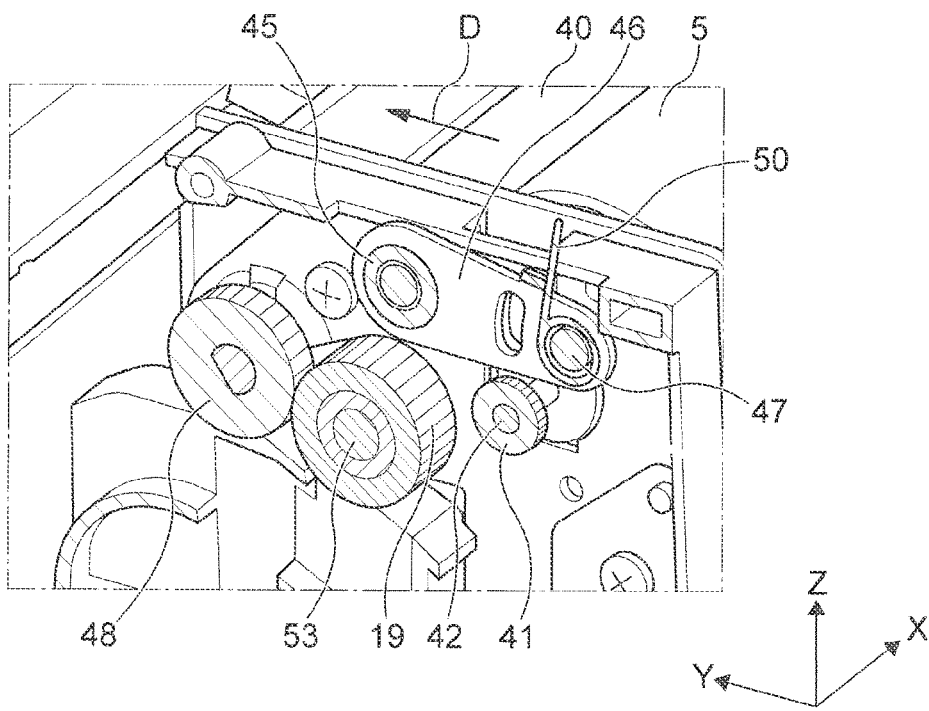
FIG. 6B is a perspective view of the main portion of the first embodiment.

As illustrated in FIGS. 3 and 6, in the embodiment, the lever position adjustment unit 25 includes a cam 251 and a one-way gear 19 (FIGS. 6A and 6B) provided on a pivot shaft 252 of the cam 251.

When the motor 5 turns forward, that is, in the first rotation direction R1, since the pair of ejection rollers 24 rotate in a direction in which the medium 3 is ejected and the cam 251 does not pivot due to the one-way gear 19, the lever position adjustment unit 25 does not operate. In addition, when the motor 5 turns backward, that is, in the second rotation direction R2, since the cam 251 pivots via the one-way gear 19, the lever position adjustment unit 25 operates.

Structure for Transmitting Power from the Motor to the Lever Position Adjustment Unit Here, the structure for transmitting power from the motor 5 to the lever position adjustment unit 25 will be described.

As illustrated in FIGS. 6A and 6B, the power of the motor 5 is transmitted to a drive pulley 41 attached to a rotation shaft 42 of the motor, a transmission belt 43, the pulley gear 44, and the rotation shaft 40 to which a pulley gear 44 is attached. The first roller 27 of the pair of ejection rollers 24 is attached to the rotation shaft 40 and rotates together with the rotation shaft 40. In this way, the power of the motor 5 is transmitted to the pair of ejection rollers 24.

In addition, as illustrated in FIG. 6B, a transmission gear 48 is attached to the rotation shaft 40 so as to rotate together with the rotation shaft 40. The transmission gear 48 is coupled to the one-way gear 19. The one-way gear 19 is attached to a gear shaft 53 so as to rotate together with the gear shaft 53. The rotation of the gear shaft 53 is transmitted to the pivot shaft 252 of the cam 251 via a gear train 54.

As a result, when the motor 5 turns forward, since the pair of ejection rollers 24 rotates in a direction in which the medium 3 is ejected and the cam 251 does not pivot due to the one-way gear 19, the lever position adjustment unit 25 does not operate. In addition, when the motor 5 turns backward, since the cam 251 pivots via the one-way gear 19, the lever position adjustment unit 25 operates.

In FIGS. 6A and 6B, reference numeral 45 denotes a tension roller, which pushes the transmission belt 43 to apply appropriate tension. The tension roller 45 is fixed to an arm 46 having a shaft 47 as a pivot fulcrum. A torsion coil spring 50 pivots the arm 46 by applying an elastic force, which pushes the tension roller 45 to apply tension to the transmission belt 43.

Figure 4A:
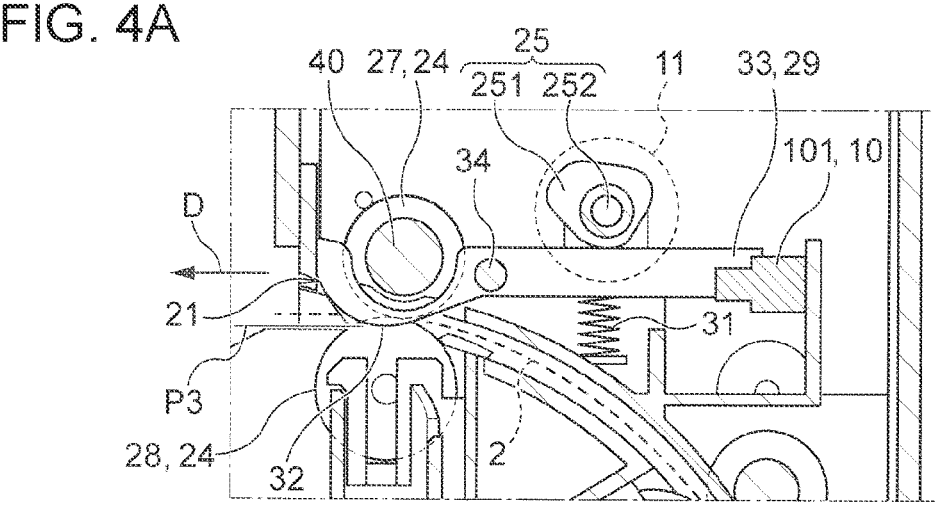
FIG. 4A is a side structural diagram of a main portion of the medium ejection device according to the first embodiment.
Figure 4B:
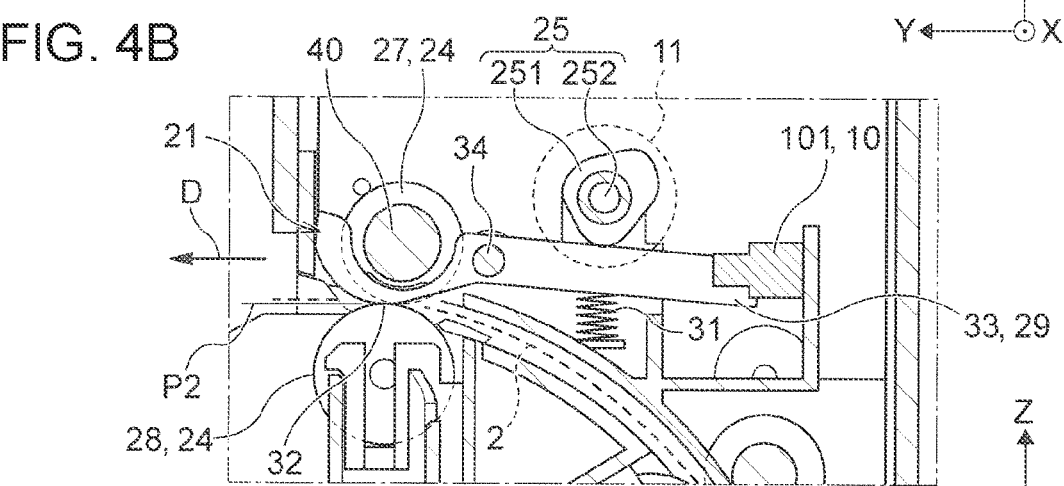
FIG. 4B is a side structural diagram of the main portion of the medium ejection device according to the first embodiment.
Figure 4C:
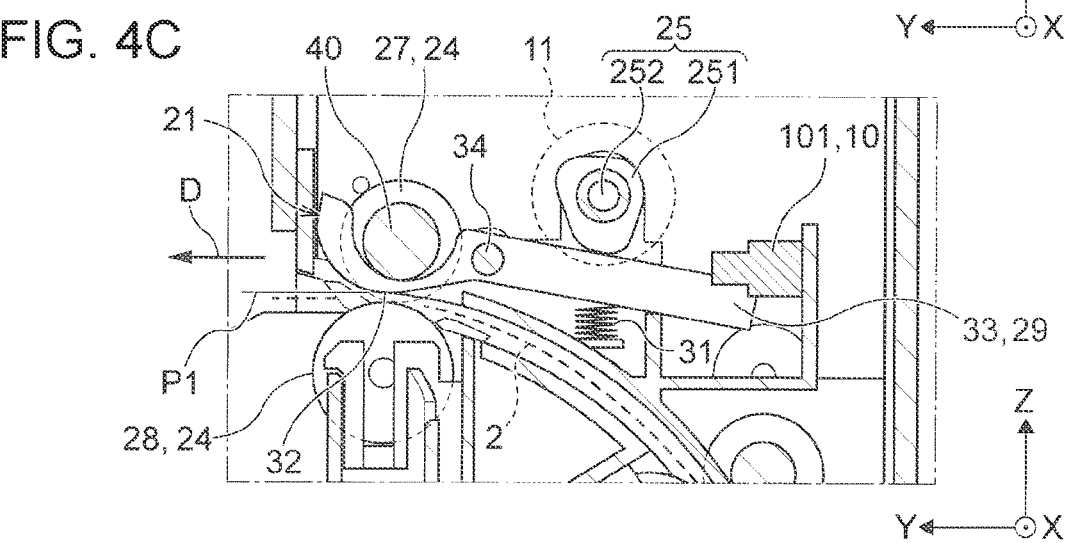
FIG. 4C is a side structural diagram of the main portion of the medium ejection device according to the first embodiment.
Figure 5A:
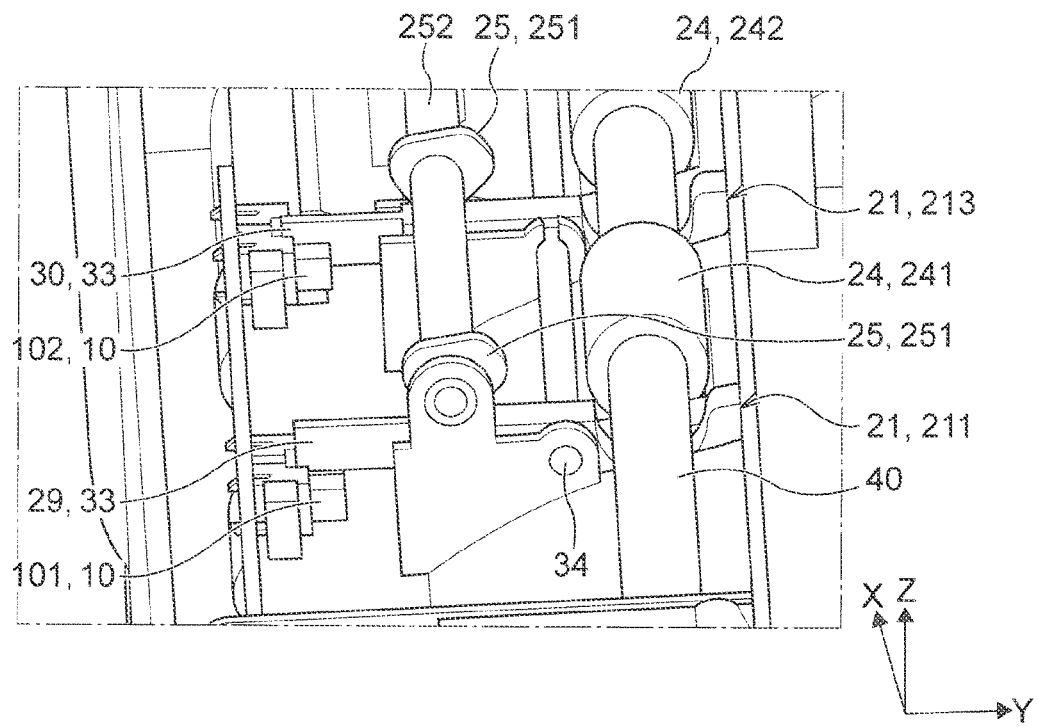
FIG. 5A is a perspective view of a main portion of the first embodiment.
Figure 5B:
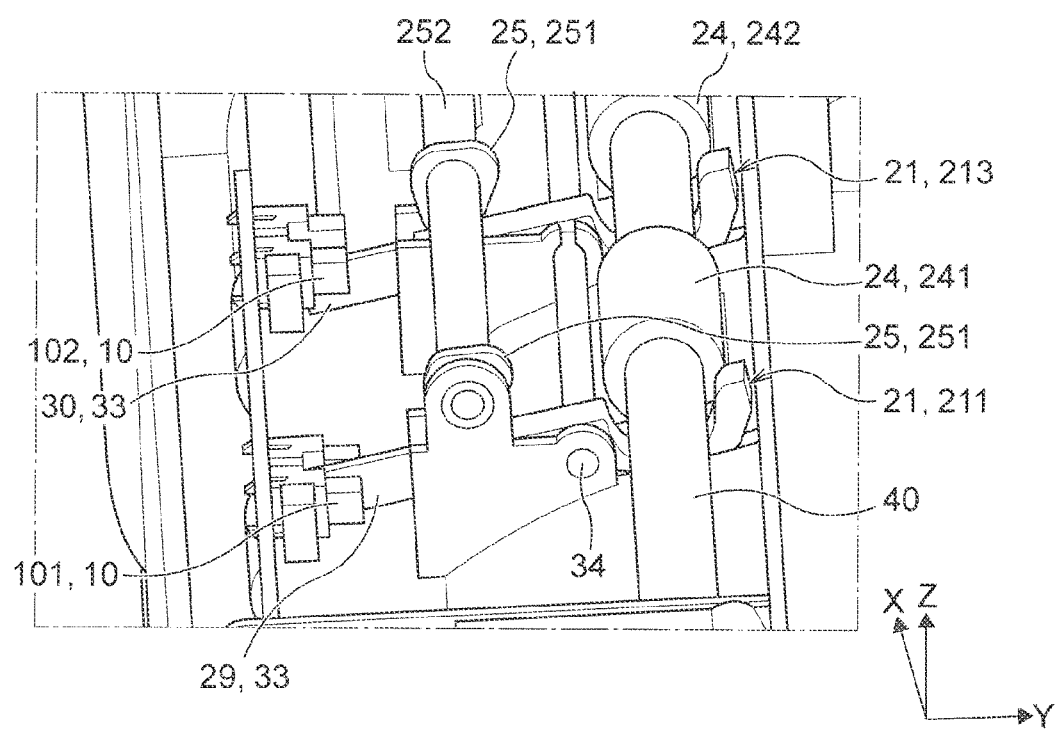
FIG. 5B is a perspective view of the main portion of the first embodiment.

As illustrated in FIGS. 4A, 4B, and 4C, in the embodiment, the medium ejection device 9 includes a position detection unit 10 that detects the advance position of the lever 21 and an encoder 11 that detects the advance amount of the lever 21. The encoder 11 is attached to the pivot shaft 252 of the cam 251. In addition, the detection result of the position detection unit 10 and the detection result of the encoder 11 are sent to the control unit 71, and the control unit 71 determines the advance position of the lever 21.

In addition, as illustrated in FIGS. 2 and 4, the position detection unit 10 is disposed at a position that overlaps part of the pair of ejection rollers 24 in the direction D in which the medium 3 is ejected. As described above, the direction D corresponds to the direction in which the medium 3 is ejected. Alternatively, the direction D may intersect the axial direction of the rotation shafts of the pair of ejection rollers 24 in the horizontal direction.

As illustrated in FIGS. 3 and 5, in the embodiment, the lever 21 includes a detected portion 33 to be detected by the position detection unit 10. The position detection unit 10 includes a first position detection unit 101 and a second position detection unit 102. The first position detection unit 101 can detect a first detected portion 29, which is the detected portion 33 of the first lever 211. The second position detection unit 102 can detect a second detected portion 30, which is the detected portion 33 of the third lever 213, which is a lever other than the first lever 211.

The first lever 211, the third lever 213, the first position detection unit 29, and the second position detection unit 30 are disposed to have the following relationship. That is, the second position detection unit 102 does not detect the third lever 213 (FIG. 5B) when the first position detection unit 101 detects the first lever 211, and the first position detection unit 101 does not detect the first lever 101 (FIG. 5A) when the second position detection unit 102 detects the third lever 213.

Specifically, each of the first position detection unit 101 and the second position detection unit 102 includes an optical sensor including a light emitting unit and a light receiving unit pair. The first position detection unit 101 detects the position of the first lever 211 when the first detected portion 29 of the first lever 211 obstructs the optical path of the optical sensor, and the second position detection unit 102 detects the position of the third lever 213 when the second detected portion 30 of the third lever 213 obstructs the optical path of the optical sensor.

As illustrated in FIGS. 2 and 4, in the embodiment, the medium ejection device 9 has a pushing member 31 that pushes the lever 21. The pushing member 31 is disposed below the lever 21 and pushes the lever 21 upward, and the pushing member 31 here is a coil spring.

The lever 21 includes the pushing portion 32 that pushes the medium 3, the detected portion 33 to be detected by the position detection unit 10, and the pivot shaft 34 provided between the pushing portion 32 and the detected portion 33. Part of the lever 21 between the pivot shaft 34 and the detected portion 33 is pushed by the pushing member 31, and part of the lever 21 between the pivot shaft 34 and the detected portion 33 is in contact with the lever position adjustment unit 25.

In addition, the pair of ejection rollers 24 are disposed to overlap part of the cam 251 and part of the pushing member 31 in the direction D in which the medium 3 is ejected.

As illustrated in FIGS. 4A, 4B, and 4C, in the embodiment, the lever 21 is moved by the lever position adjustment unit 25 to the first advance position P1 (FIG. 4C) and a second advance position P2 (FIG. 4B) located beyond the first advance position P1. In addition, the lever 21 is moved to a third advance position P3 located beyond the second advance position P2.

Here, the first advance position P1 corresponds to the medium 3, which is, for example, thick paper that has high rigidity and a low risk of buckling, and the third advance position P3 corresponds to the medium 3, which is, for example, thin paper that has low rigidity and has a high risk of buckling. The second advance position P2 corresponds to the medium 3 having rigidity greater than that of thin paper or the like and less than that of thick paper or the like.

As illustrated in FIG. 1, in the embodiment, the medium ejection device 9 includes the control unit 71, the separation roller 7 serving as a separating unit that separates one medium 3 from multi-fed media 3, and a medium thickness detection unit 49, which is disposed downstream of the separation roller 7 in the transport direction F and detects information regarding the thickness of the medium 3.

In most of the media 3, a medium with a small thickness, such as thin paper or the like, has low rigidity, and a medium with a greater thickness than thin paper or the like, such as standard paper or the like, has higher rigidity than thin paper or the like. It is possible to distinguish between a medium with low rigidity and a medium with high rigidity in accordance with the information regarding the thickness of the medium 3 detected by the medium thickness detection unit 49. The first threshold is set to distinguish between thin paper or the like and standard paper or the like in accordance with the detection result of the medium thickness detection unit 49. As a result, the control unit 71 determines that the medium 3 is thin paper or the like when the detection result of the medium thickness detection unit 49 is less than the first threshold or determines that the medium 3 is standard paper or the like when the detection result is equal to or greater than the first threshold.

As illustrated in FIGS. 4A and 4B, the medium thickness detection unit 49 detects the medium 3 separated by the separation roller 7, and the control unit 71 moves the lever 21 to the second advance position P2 corresponding to standard paper or the like when the detection result of the medium thickness detection unit 49 is equal to or greater than the first threshold. In addition, when the detection result of the medium thickness detection unit 49 is less than the first threshold, the control unit 71 moves the lever 21 to the third advance position P3 that corresponds to thin paper or the like.

As illustrated in FIG. 4C, in the embodiment, the control unit 71 moves the lever 21 to the first advance position P1 when the detection result of the medium thickness detection unit 49 is equal to or greater than the second threshold, which is greater than the first threshold.

The second threshold is set to distinguish between standard paper or the like and thick paper or the like, which is thicker than standard paper or the like, in accordance with the detection result of the medium thickness detection unit 49. The control unit 71 determines that the medium 3 is standard paper or the like when the detection result of the medium thickness detection unit 49 is less than the second threshold or determines that the medium 3 is thick paper or the like when the detection result is equal to or greater than the second threshold.

In the embodiment, the control unit 71 can receive the selected type of the medium 3 and determines the advance position of the lever 21 based on the type of the medium 3 selected by the user.

In addition, the control unit 71 can also determine the advance position of the lever 21 based on the detection result of the medium thickness detection unit 49. In this case, when the current advance position of the lever 21 does not match the detection result of the medium thickness detection unit 49, the control unit 71 stops transport of the medium 3, matches the current advance position of the lever 21 with the detection result, and resumes transport of the medium 3.

A personal computer is coupled to the image reading device 1 to enable the settings of various reading operations of the image reading device 1 that are to be displayed on the display screen of the image reading device 1, and examples thereof include "the media type is automatically detected by the medium thickness detection unit" and "the media type is set by the user instead of being set automatically".

In the embodiment, in the image reading device 1 of this type, the control unit 71 performs a reading operation based on the information input from the display screen. At this time, the display screen displays "Automatic detection" corresponding to "the media type is automatically detected by the medium thickness detection unit", "User setting" corresponding to "the media type is set by the user instead of being set automatically", and the like.

Figure 9:
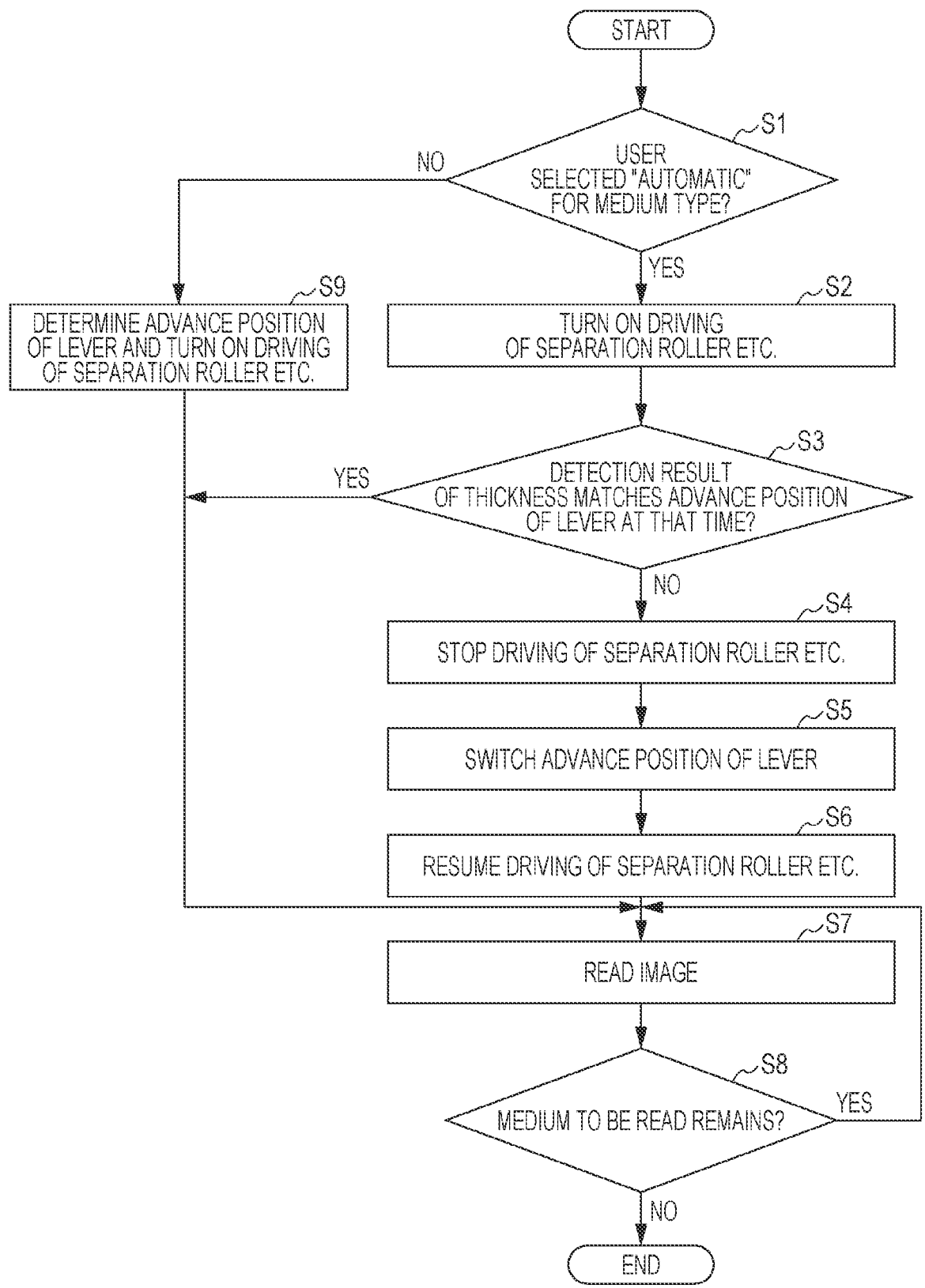
FIG. 9 is a flowchart of the first embodiment.

Automatic Determination of the Advance Position of the Lever by the Medium Thickness Detection Unit An example of the structure in which the control unit 71 automates the determination of the advance position of the lever 21 by the medium thickness detection unit 49 and the control procedure thereof will be described with reference to the flowchart in FIG. 9.

First, in step S1, it is determined whether the user has selected "Automatic" in specifying the type of the medium 3, that is, the type of standard paper, thick paper, or the like, on the display screen of a personal computer. In the case of Yes, the processing proceeds to step S2 and activates driving of the separation roller 7 and the like to start transport of the medium 3. The thickness of the medium 3 is detected when the front end of the medium 3 to be transported reaches the detection position of the medium thickness detection unit 49, and it is determined in step S3 whether the detection result matches the current advance position of the lever 21.

In the case of No, the processing proceeds to step S4. In step S4, the driving of the separation roller 7 and the like is stopped and transport is stopped. Subsequently, in step S5, the lever position adjustment unit 25 switches the advance position of the lever 21 such that the advance position matches the detection result. Subsequently, the processing proceeds to step S6 and activates driving of the separation roller 7 again. In step S7, the reading units 51 and 52 read an image. Subsequently, in step S8, it is determined whether the medium 3 has not yet been read, and in the case of Yes, the process returns to the step S7. On the other hand, in the case of No, the processing ends.

In the case of No in step S1, the processing proceeds to step S9. In step S9, the advance position of the lever 21 selected by the user is set, the driving of the separation roller and the like is activated to transport the medium 3, and the processing proceeds to step S7. In the case of Yes in step S3, the processing proceeds to step S7.

Description of the Operation of the First Embodiment

The control unit 71 adjusts the advance position of the lever 21 such that the advance position matches the thickness based on information regarding the thickness of the medium 3 to be transported. Specifically, when the medium 3 to be transported is thin paper, the control unit 71 receives information indicating thin paper, and, when the advance position of the lever corresponds to thin paper, the control unit 71 ejects the medium 3 at this advance position.

On the other hand, when the current advance position of the lever does not correspond to standard paper, which differs from thin paper, the processing first stops transport of the medium 3. Then, in this stop state, the processing rotates the cam 251 of the lever position adjustment unit 25 to pivot the lever 21, moves the pushing portion 32 of the lever 21 in the movement direction to the advance position for thin paper from the advance position for standard paper, and stops the lever 21 at this position. Then, the processing resumes transport of the medium 3 and ejects the medium 3.

The power for rotating the lever position adjustment unit 25 to change the advance position of the lever 21 is transmitted from the motor 5 to the lever position adjustment unit 25 through the one-way gear 19.

Description of Effects of the First Embodiment (1) The medium ejection device according to the embodiment includes the lever 21 that moves in a movement direction from one of the first roller 27 and the second roller 28 constituting the pair of ejection rollers 24 to another of the first roller 27 and the second roller 28 and can push the medium 3 nipped between the pair of ejection rollers 24 and the lever position adjustment unit 25 that moves the lever 21 in the movement direction to adjust an advance position. As a result, the medium 3 ejected from the pair of ejection rollers 24 is pushed by the lever 21 being moved, and the rigidity of the medium 3 increases due to deformation caused by the pushing. An increase in the rigidity of the medium 3 reduces the risk of the medium 3 being bent downward in an intermediate portion due to the weight of the front end in the ejection direction of the medium 3, that is, the risk of so-called buckling. Accordingly, the alignment of the media 3 elected from the pair of ejection rollers 24 on the ejection receiving unit 16 can be improved.

In addition, the turning of the motor 5 in the first rotation direction R1 rotates the pair of ejection rollers 24 in the direction in which the medium 3 is ejected, and the turning of the motor 5 in the second rotation direction R2 that differs from the first rotation direction R1 transmits power to the lever position adjustment unit 25 and moves the first lever 211 and the second lever 212. As described above, since the motor 5 that transmits power to the pair of ejection rollers 24 is also used as the power source of the lever position adjustment unit 25, a new motor need not be added, and the size can be suppressed from increasing.

(2) In addition, in the embodiment, the third lever 213 that differs from the first lever 211 and the second lever 212 is provided between the pair of first ejection rollers 241 and the pair of second ejection rollers 242. This can further increase the rigidity of the medium 3 and reduce the risk of the medium 3 being bent downward in an intermediate portion due to the weight thereof.

(3) In addition, in the embodiment, since the advance position of the lever 21 is determined based on the detection result of the position detection unit 10 and the detection result of the encoder 11, the advance position of the lever 21 can be determined accurately in accordance with the type of the medium 3.

(4) In addition, in the embodiment, the position detection unit 10 is disposed at a position that overlaps part of the pair of ejection rollers 24 in the direction D in which the medium 3 is ejected. This can suppress the size of the device in the height direction from increasing.

(5) In addition, in the embodiment, the first lever 211, the second lever 212, the first position detection unit 101, and the second position detection unit 102 are disposed such that the second position detection unit 102 does not detect the second lever 212 when the first position detection unit 101 detects the first lever 211, and the first position detection unit 101 does not detect the first lever 211 when the second position detection unit 102 detects the second lever 212. As a result, the advance position of the lever 21 can be detected in a simple structure without the encoder 11 being provided.

(6) In addition, in the embodiment, when the motor 5 turns in the first rotation direction R1, since the pair of ejection rollers 24 rotate in a direction in which the medium 3 is ejected and the cam 251 does not pivot due to the one-way gear 19, the lever position adjustment unit 25 does not operate. On the other hand, when the motor 5 turns in the second rotation direction R2, since the cam 251 pivots via the one-way gear 19, the lever position adjustment unit 25 operates. As a result, since the one-way gear 19 is provided, the lever position adjustment unit 25 need not be moved when the motor 5 turns in the first rotation direction R1. Accordingly, since the lever position adjustment unit 25 is not driven when the medium 3 is ejected, stable ejection is ensured.

(7) In addition, in the embodiment, the lever 21 includes the pushing portion 32 that pushes the medium 3, the detected portion 33 to be detected by the position detection unit 10, and the pivot shaft 34 provided between the pushing portion 32 and the detected portion 33, part of the lever 21 between the pivot shaft 34 the detected portion 33 is pushed by the pushing member 31, and part of the lever 21 between the pivot shaft 34 and the detected portion 33 is in contact with the lever position adjustment unit 25. As a result, the operation of the lever 21 can be achieved in a simple structure.

In addition, the pair of ejection rollers 24 are disposed at a position that overlaps part of the cam 251 and part of the pushing member 31 in the direction D in which the medium 3 is ejected. This can suppress the size of the device in the height direction from increasing.

(8) In addition, in the embodiment, the lever 21 is moved by the lever position adjustment unit 25 to a first advance position P1 and a second advance position P2 located beyond the first advance position P1. Accordingly, each of two media 3 with different thicknesses can be ejected so as to have appropriate rigidity.

(9) In addition, since the lever 21 is moved to the third advance position P3 located beyond the second advance position P2, each of three media 3 with different thicknesses can be ejected so as to have appropriate rigidity.

(10) In addition, in the embodiment, the medium thickness detection unit 49 detects the medium 3 separated by the separating unit 7, and the control unit 71 moves the lever 21 to the second advance position P2 when the detection result of the medium thickness detection unit 49 is equal to or greater than the first threshold or moves the lever 21 to the third advance position P3 when the detection result of the medium thickness detection unit 49 is smaller than the first threshold. As a result, since, for example, the control unit 71 moves the lever 21 to the second advance position P2 when the medium thickness detection unit 49 detects standard paper or the control unit 71 moves the lever 21 to the third advance position P3 when the medium thickness detection unit 49 detects thin paper that is thinner and less rigid than standard paper, the advance position of the lever 21 can be appropriately set in accordance with the thicknesses of two types of media 3.

(11) In addition, in the embodiment, when the detection result of the medium thickness detection unit 49 is equal to or greater than the second threshold, which is greater than the first threshold, the control unit 71 moves the lever 21 to the first advance position P1. As a result, since the control unit 71 moves the lever 21 to the first advance position P1 when the medium thickness detection unit 49 detects thick paper that is thicker and more rigid than standard paper, the advance position of the lever 21 can be appropriately set in accordance with the thicknesses of three types of media 3.

(12) In addition, in the embodiment, since the control unit 71 can receive the selected type of the medium 3 and determines the advance position of the lever 21 based on the selected type of the medium 3, the control unit 71 can select the advance position of the lever 21 based on the thickness of the medium 3 selected by the user.

(13) In addition, in the embodiment, when the current advance position of the lever 21 does not match the detection result of the medium thickness detection unit 49, the control unit 71 stops transport of the medium 3 and matches the current advance position of the lever 21 with the detection result. As a result, the advance position with the lever 21 can be set with great certainty.

(14) In addition, in the embodiment, an odd number of the levers 21 are disposed, and the number of the levers 21 disposed in the second region E2 on one side of the first region E1 that is the center region is identical to the number of the levers 21 disposed in the third region E3 on the other side of the first region E1. As a result, with respect to the medium 3 to be ejected, the number of the levers 21 that push the medium 3 on the left side and the number of the levers 21 that push the medium 3 on the right side in the width direction (X-axis direction) are identical to each other, the medium 3 can be ejected in a well-balanced state between the left and right sides.

Second Embodiment

Next, the medium ejection device 9 according to the second embodiment will be described. The same components as in the first embodiment are given the same reference numerals, and description thereof and corresponding effects will be omitted.

In the embodiment, the control unit 71 stops transport of the medium 3 after obtaining the detection result of the type of the medium 3 detected by the body thickness detection unit 49. Then, the control unit 71 determines the advance position of the lever 21 based on the detection result of the medium thickness detection unit 49, moves the lever 21 to the determined advance position of the lever 21, and resumes transport of the medium 3.

In the embodiment, since the control unit 71 once stops transport of the medium 3 after the detection by the medium thickness detection unit 49, the advance position of the lever 21 can be set with great certainty.

Third Embodiment

Figure 8A:
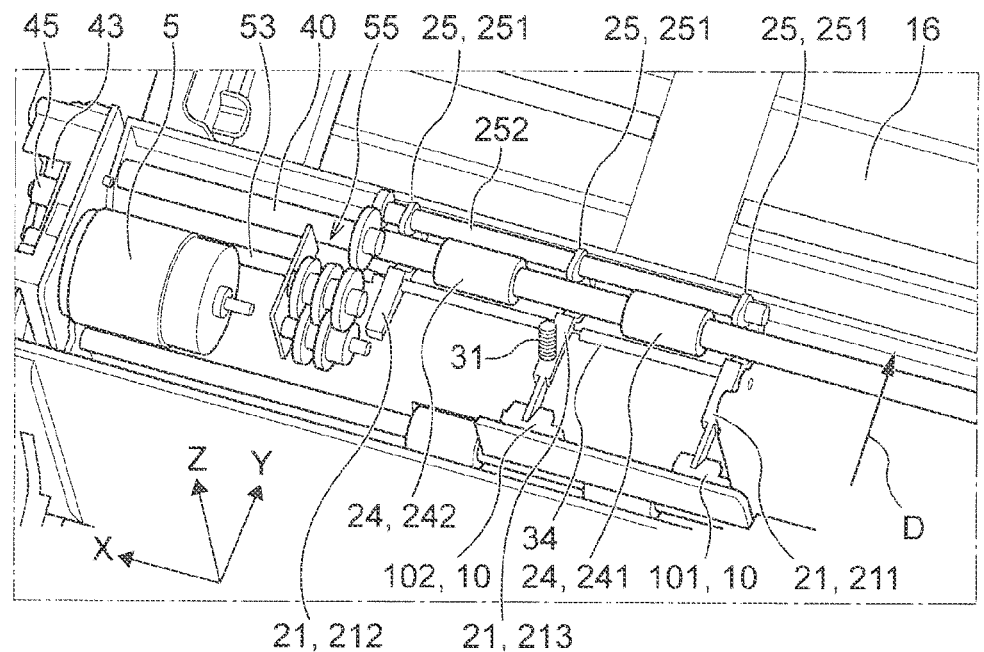
FIG. 8A is a perspective view of a main portion of a second embodiment.

Next, the medium ejection device 9 according to the third embodiment will be described with reference to FIGS. 8A and 8B. The same components as in the first embodiment are given the same reference numerals, and description thereof and corresponding effects will be omitted.

In the embodiment, the pushing member 31 that pushes the lever 21 is provided. Unlike the pushing member 31 in the first embodiment, this pushing member 31 is disposed above the lever 21 (FIG. 8B), pushes the lever 21 downward, and includes a coil spring.

Figure 8B:
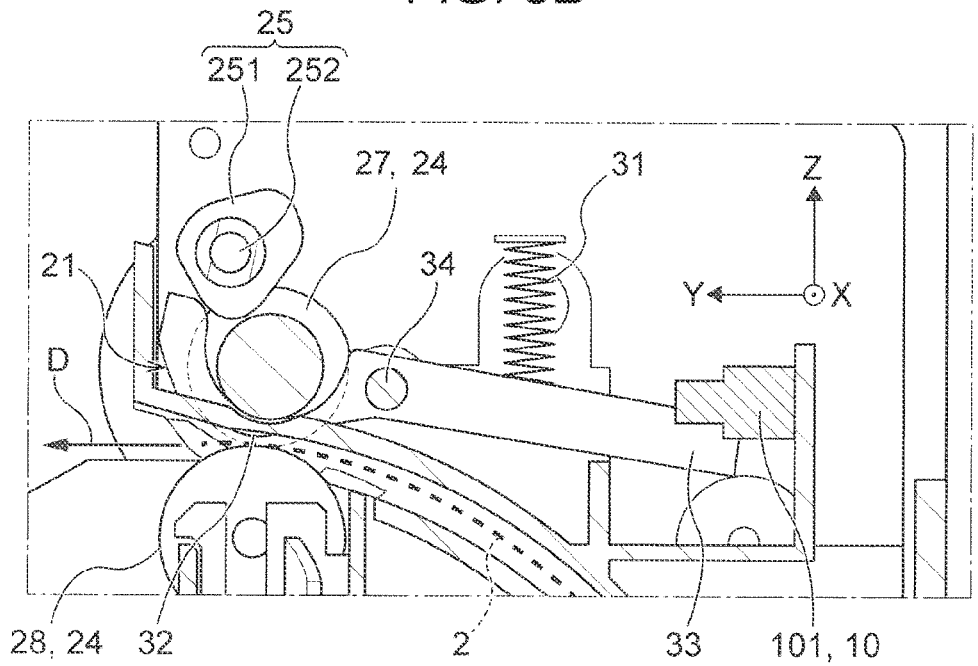
FIG. 8B is a side structural diagram of the main portion of the second embodiment.

As illustrated in FIG. 8B, the lever 21 has the pushing portion 32 that pushes the medium 3, the pivot shaft 34 is provided between the pushing portion 32 and the pushing member 31, and the lever position adjustment unit 25 is in contact with the lever 21 on the opposite side of the pushing member 31 with the pivot shaft 34 therebetween.

In addition, the pair of ejection rollers 24 are disposed to overlap part of the lever position adjustment unit 25 and part of the pushing member 31 in the direction D in which the medium 3 is ejected.

In the embodiment, the lever 21 has the pivot shaft 34 between the pushing portion 32 and the pushing member 31, and the lever position adjustment unit 25 is in contact with the lever 21 on the opposite side of the pushing member 31 with the pivot shaft 34 therebetween and pivots the lever 21. As a result, the operation of the lever 21 can be achieved in a simple structure that differs from the structure of the first embodiment.

In addition, since the pair of ejection rollers 24 are disposed at a position that overlaps part of the lever position adjustment unit 25 and part of the pushing member 31 in the direction D in which the medium 3 is ejected, the size of the device in the height direction can be suppressed from increasing.

Other Embodiments

The image reading device 1 according to the present disclosure basically has the structures of the embodiments described above, but partial structural changes, omissions, or the like may be made within the scope of the gist of the present disclosure.

What is claimed is:
1. A medium ejection device comprising:
a pair of ejection rollers including a first roller and a second roller that nip and eject a medium to be transported;
a lever that is movably disposed at a position overlapping the pair of ejection rollers in an axial direction parallel to rotation shafts of the pair of ejection rollers, the lever moving in a movement direction from one of the first roller and the second roller to another of the first roller and the second roller to push the medium nipped between the pair of ejection rollers;
a lever position adjustment unit that moves the lever in the movement direction to adjust an advance position; and
a motor that transmits power to the pair of ejection rollers, wherein
the lever includes a first lever and a second lever, the first lever being located on one side of the pair of ejection rollers in the axial direction, the second lever being located on another side of the pair of ejection rollers in the axial direction away from the first lever,
the first lever and the second lever are disposed to sandwich the pair of ejection rollers in the axial direction, and
turning of the motor in a first rotation direction rotates the pair of ejection rollers in a direction in which the medium is ejected, and turning of the motor in a second rotation direction that differs from the first rotation direction transmits power to the lever position adjustment unit and moves the first lever and the second lever to the advance position.

2. The medium ejection device according to claim 1, wherein
the pair of ejection rollers includes a pair of first ejection rollers and a pair of second ejection rollers spaced apart from the pair of first ejection rollers in the axial direction, the first ejection roller being one of the pair of first ejection rollers, the second ejection roller being one of the pair of second ejection rollers, and
a third lever that differs from the first lever and the second lever is provided between the pair of first ejection rollers and the pair of second ejection rollers.

3. The medium ejection device according to claim 2, wherein
an odd number of levers are disposed, the lever being one of the odd number of levers,
when a region between the pair of first ejection rollers and the pair of second ejection rollers is a first region or a center region and regions on both sides of the first region are a second region and a third region, the number of the levers disposed in the second region is identical to the number of the levers disposed in the third region.

4. The medium ejection device according to claim 2, further comprising:
a pushing member that pushes the lever, wherein
the lever includes a pushing portion that pushes the medium,
a pivot shaft is provided between the pushing portion and the pushing member,
the lever position adjustment unit is in contact with the lever on an opposite side of the pushing member with the pivot shaft therebetween, and
the pair of ejection rollers overlaps part of the lever position adjustment unit and part of the pushing member in a direction in which the medium is ejected.

5. The medium ejection device according to claim 1, further comprising:
a position detection unit that detects the advance position of the lever; and
an encoder that detects an advance amount of the lever, wherein
the advance position of the lever is determined based on a detection result of the position detection unit and a detection result of the encoder.

6. The medium ejection device according to claim 5, wherein
the position detection unit is disposed at a position that overlaps part of the pair of ejection rollers in a direction in which the medium is ejected.

7. The medium ejection device according to claim 1, further comprising:
a position detection unit that detects the advance position of the lever, wherein
the position detection unit includes a first position detection unit and a second position detection unit,
the first position detection unit is configured to detect a first detected portion of the first lever,
the second position detection unit is configured to detect a second detected portion of another lever different to the first lever, and
the first lever, the other lever, the first position detection unit, and the second position detection unit are disposed such that the second position detection unit does not detect the other lever when the first position detection unit detects the first lever, and the first position detection unit does not detect the first lever when the second position detection unit detects the other lever.

8. The medium ejection device according to claim 1, wherein
the lever position adjustment unit includes a cam and a one-way gear provided on a pivot shaft of the cam,
since the cam does not pivot due to the one-way gear when the motor turns in the first rotation direction, the lever position adjustment unit does not operate, and
since the cam pivots via the one-way gear when the motor turns in the second rotation direction, the lever position adjustment unit operates.

9. The medium ejection device according to claim 1, further comprising:
a position detection unit that detects the advance position of the lever; and
a pushing member that pushes the lever, wherein
the lever includes a pushing portion that pushes the medium, a detected portion to be detected by the position detection unit, and a pivot shaft provided between the pushing portion and the detected portion,
part of the lever between the pivot shaft and the detected portion is pushed by the pushing member, part of the lever between the pivot shaft and the detected portion is in contact with the lever position adjustment unit, and
the pair of ejection rollers overlaps part of the cam and part of the pushing member in a direction in which the medium is ejected.

10. The medium ejection device according to claim 1, wherein
the lever is moved by the lever position adjustment unit to a first advance position and a second advance position located beyond the first advance position.

11. The medium ejection device according to claim 10, wherein
the lever is moved to a third advance position located beyond the second advance position.

12. The medium ejection device according to claim 11, further comprising:
a control unit;
a separating unit that separates one medium from multi-fed media; and
a medium thickness detection unit that is disposed downstream of the separating unit in a transport direction of the medium and detects information regarding a thickness of the medium, wherein
the control unit causes the medium thickness detection unit to detect the medium separated by the separating unit and moves the lever to the second advance position when a detection result of the medium thickness detection unit is equal to or greater than a first threshold or moves the lever to the third advance position when the detection result of the medium thickness detection unit is smaller than the first threshold.

13. The medium ejection device according to claim 12, wherein
the control unit moves the lever to the first advance position when the detection result of the medium thickness detection unit is equal to or more than a second threshold that is greater than the first threshold.

14. The medium ejection device according to claim 12, wherein
the control unit is configured to receive a selected type of the medium and determines the advance position of the lever based on the selected type of the medium.

15. The medium ejection device according to claim 12, wherein
the control unit stops transport of the medium after the medium thickness detection unit detects the medium, determines the advance position of the lever based on the detection result of the medium thickness detection unit, moves the lever to the determined advance position of the lever, and resumes transport of the medium.

16. The medium ejection device according to claim 12, wherein
the control unit determines the advance position of the lever based on the detection result of the medium thickness detection unit and, when the current advance position of the lever does not match the detection result, stops transport of the medium, matches the current advance position of the lever with the detection result, and resumes transport of the medium.

17. An image reading device comprising:
the medium ejection device according to claim 1; and
a reading unit that is located upstream of the medium ejection device in a transport direction of the medium and reads the medium to be transported, wherein
the medium that passed through the reading unit is ejected by the pair of ejection rollers.

* * * * *